United States Patent [19]
Jansen-Herfeld

[11] 4,024,785
[45] May 24, 1977

[54] SPIRAL SAW BLADE

[75] Inventor: Röttger Jansen-Herfeld, Remscheid-Hasten, Germany

[73] Assignee: W. F. Meyers Company, Inc., Bedford, Ind.

[22] Filed: Feb. 27, 1974

[21] Appl. No.: 446,492

[30] Foreign Application Priority Data
  Mar. 8, 1973   Germany .................. 2311377

[52] U.S. Cl. ..................... 83/848; 83/835; 83/837
[51] Int. Cl.² ....................... B49C 61/02
[58] Field of Search .......... 83/665, 666, 676, 835, 83/846, 847, 848, 854, 855; 29/95 C, 103 R, 103 C, 567; 144/238, 239

[56] References Cited
UNITED STATES PATENTS

| | | | |
|---|---|---|---|
| 336,661 | 2/1886 | Peck | 83/665 X |
| 1,358,533 | 11/1920 | Elston | 144/238 X |
| 1,715,375 | 6/1929 | Mansfield | 144/238 X |
| 2,756,787 | 7/1956 | Siese | 144/239 |
| 2,845,102 | 7/1958 | Woodell | 83/854 X |
| 3,082,524 | 3/1963 | Schaeffer | 83/854 X |
| 3,690,357 | 9/1972 | Lugo | 83/848 X |
| 3,730,038 | 5/1973 | Farb | 83/854 X |

FOREIGN PATENTS OR APPLICATIONS

| | | | |
|---|---|---|---|
| 5,881 | 4/1890 | United Kingdom | 83/854 |

Primary Examiner—J. M. Meister
Attorney, Agent, or Firm—Cooper, Dunham, Clark, Griffin & Moran

[57] ABSTRACT

The invention relates to a spiral saw blade wherein the teeth are divided into two or more groups with gaps or cut-outs between the groups of teeth, such gaps or cut-outs being void of teeth. The gaps or cut-outs are disposed diametrally opposite each other on the spiral saw blade, and, hence, on rotation the centrifugal forces go through the middle point of the saw blade and their maximum values are directed toward the groups of teeth respectively. Also, the invention provides teeth of varying heights with the first tooth of each group of least height and each succeeding tooth of progressively higher height, with a magnitude of height of the lowest compared to the highest no more than 2% of the diameter of the saw blade. The invention also provides a reinforcing salient in front of the first tooth of each tooth group which protects the first tooth from excessive stresses.

1 Claim, 7 Drawing Figures

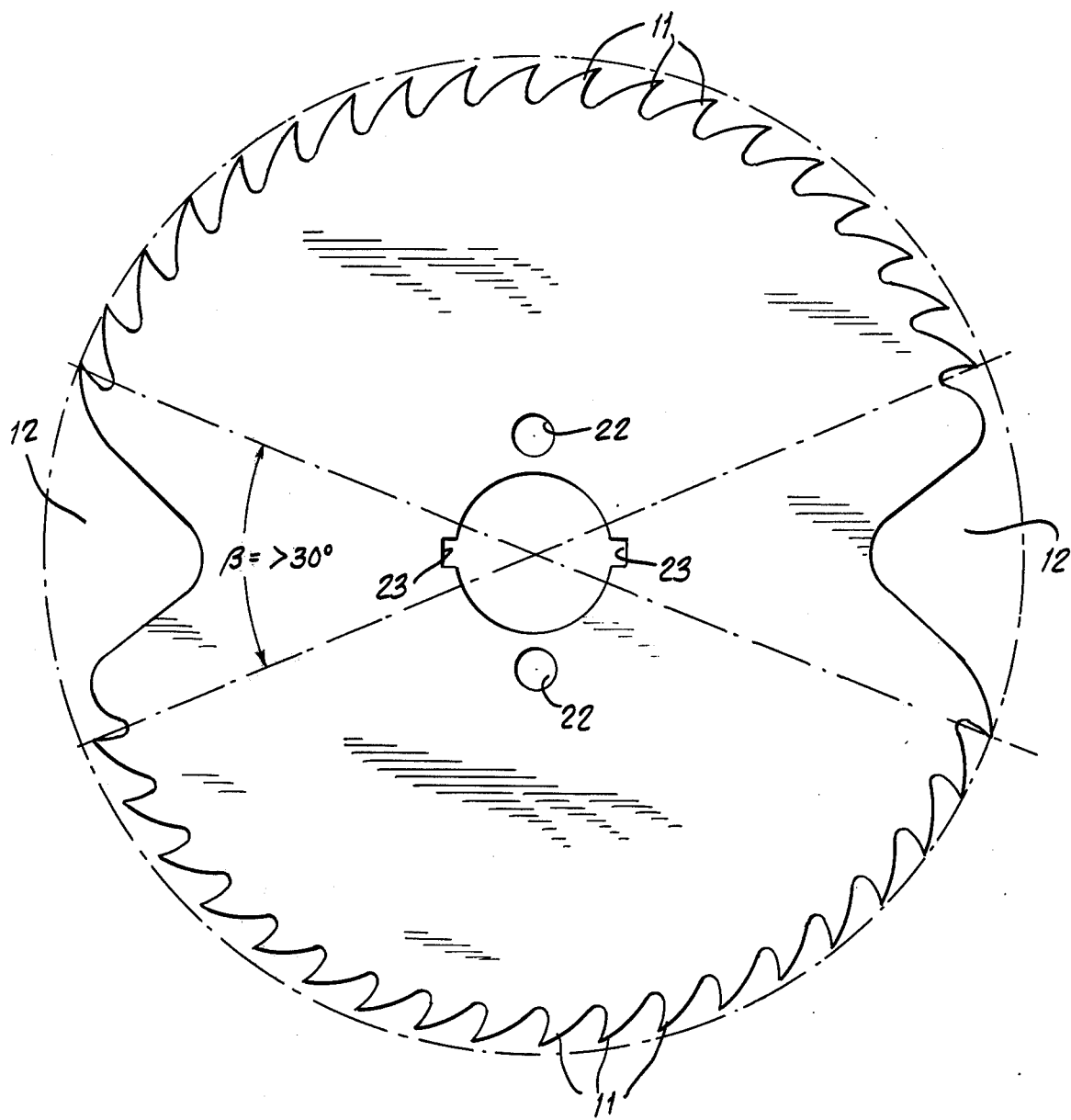

SPIRAL SAW BLADE

The invention relates to a spiral saw blade whose teeth are divided into two or more groups, and wherein in each group of teeth each succeeding tooth projects further towards the periphery than does the tooth immediately preceding it.

Known spiral saw blades of the type referred to have the drawback that only a fraction of the teeth come into engagement with the work, because the difference in the height of the teeth is too great, and the spacing between the groups of teeth is too small.

There are also known spiral saw blades wherein the teeth are divided into a great number of similar groups of teeth. With this spiral saw blade however approximately equal and rotationally symmetrical centrifugal forces occur.

While it is recognized that with both these known spiral saw blades acceptable sawings performance can be obtained, the problem as to heat stresses, centrifugal stresses and the production of vibrations are not solved.

The fundamental object of the invention is to make a spiral saw blade of the kind referred to above, with which the sawing performance is substantially improved through effective influencing of the heat stresses, the centrifugal stresses, and the production of vibrations. In accordance with the invention this object is accomplished by providing a balanced sprial saw blade having two groups of teeth, and between said two groups of teeth two approximately opposite cut-outs in the saw plate. With this construction it has been found that in use the centrifugal forces that result go through the middle point of the saw blade and having their maximum value directed toward the two groups of teeth. Additionally, according to the present invention the difference between the height of the highest and lowest tooth of a group of teeth is of the order of magnitude of at most 2% of the diameter of the saw blade, and the lengths of the gaps between groups of teeth are proportioned to one another as a function of the advance in such a way that all teeth of both groups are subjected to substantially equal loading. With this construction, all teeth of each tooth group are utilized in the sawing, the centrifugal stresses and the heat expansions are conducted in predetermined paths, and the spiral saw blade gives a substantially improved sawing performance.

According to the present invention the cut-outs in the saw plate between the groups of teeth form spaces void of teeth. These spaces or gaps create the desired different centrifugal forces, whose maximum values run in approximately the direction of the tooth groups.

Also, the foremost tooth of each tooth group is subjected to a smaller load than the following teeth. Through this it is ensured that in each case the first tooth of each tooth group is subjected to less load. Thus the endangered first tooth of each group is protected from injury.

Advantageously, the maximum value of the resultant centrifugal forces in one direction are at least 10% greater than the minimum value of the resultant centrifugal forces situated between them in the other direction. Through the proposed difference between the different centrifugal forces the internal stresses and the heat expansions are conducted in predetermined paths, so that sawing performance of the spiral saw blade avoids distortions or the like of the saw blade. The resultant tangential material expansions produced by one different centrifugal forces, when plotted radially of the center point of the saw blade, give an approximate oval.

The gaps between the teeth groups preferably have a center-point angle $\beta$ of at least 30°. Through this the first tooth of each tooth group comes into engagement only after the lapse of a certain time after the last tooth of the preceding tooth group was at the same place.

In an advantageous way the cut-outs run from the outer edge of the spiral saw blade. This results in a saving of material, because the spiral saw blades can be made from sheet metal that is not quadratic.

The spaces between the groups of teeth are made of circular-segment form. Through this a relatively large amount of material can be saved here.

The cut-outs extending into the region within the base-circle of the teeth are arranged to form a salient spaced in each case ahead of the front tooth, in the direction of rotation, of each tooth group. Through this the front tooth, in the direction of rotation, of each tooth group is provided with a reinforcing salient, so that the first tooth of each tooth group is substantially better able to withstand stresses or the like.

The front edge of the salient in the direction of rotation is made to fall off and merge into the cut-out. Thus corners or the like at the front edges of the salients are avoided.

The angle between the front edge of the salient and the rim speed vector is less than 90°. Furthermore, the front edge of the salients, particularly in the case of spiral saw blades having teeth that are only slightly set, may be sharpened knife fashion. Through this centering in the saw-cut is obtained.

The teeth within each tooth group may be divided into a large number of tooth groups, and each tooth group may have only two teeth set to different sides. Hence, the front teeth in the direction of rotation of adjacent tooth groups may be set to different sides, whereby, a deviation of the spiral saw blade in the saw-cut is avoided. Furthermore, the cut-outs may flare outwardly funnel-fashion.

The salients may be made as advance-limiting salients. This ensures that with proper use of the spiral saw blade the advance-limiting salient presses back the part being sawed in the event that this piece of work becomes pressed too far into the gap between two successive tooth groups, so that the first tooth of each group becomes subjected to an allowable load.

Preferably, at least the front flanks of the advance-limiting salients are made as abutment bevels. This ensures that, with proper use of the spiral saw blade the advance-limiting salient comes to bear by this abutment bevels against the piece of work, and presses it back by these abutment bevels, so that the first tooth of each tooth group becomes subjected only to the allowable load.

Preferably also, the advance-limiting salients are advantageously made to decrease in the direction of rotation, whereby there is avoided a push-back of the piece of work.

The advance-limiting salients have at both sides ribs that taper down toward the front, whereby the total width of each advance-limiting salient closely approaches the width of the toothpoints path of travel. By this means lateral deviation of the spiral saw blade in the saw-cut is avoided, in spite of the dividing up of the teeth of the spiral saw blade into tooth groups, by means of gaps, because the lateral ribs at the advance-limiting salients realign the saw-cut before the engagement of the first tooth of each tooth-group. The forward taper-down of the side ribs also contributes to this.

The ribs provided at both sides of the advance-limiting salients advantageously taper down in the direction of rotation. Thus, jerky alignments of the spiral saw blade in the saw-cut in the piece of work are avoided.

The ribs provided at both sides of the advance-limiting salients are advantageously formed by bulging them out. It is thus possible in a particularly simple way to form the side ribs on the advance-limiting salients. It is also possible in a simple way to make the ribs at both sides of the advance-limiting salients of welded-on small wedgeshape metal pletes.

The ribs provided at both sides of the advance-limiting salients may also be formed advantageously of bent-out tongues. Through this it is possible in a simple way to stamp out tongues, from the advance-limiting salients, that are bent out from both sides.

The cut-outs of circular-segment shapes advantageously have a depth of at least 7% of the tooth-tips path diameter. This ensures that the cut-outs between individual tooth-groups are large enough, and that each group still has a sufficient number of teeth.

Each pair of tooth-groups are advantageously diametrically opposite one another. The spiral saw blade is thereby counterbalanced.

The spiral saw blade may have an opening, a hole, a spline-groove, or a cut-out, for fitting it on a special sharpening mechanism.

The front edge may be provided with a cutting strip, whose width in the structure of rotation increases, and whose length extends approximately to the radially deepest point of the cut-out.

The drawings show the invention by a number of examples of construction, and:

FIG. 7 shows a side view another spiral saw blade.

Figure 1:
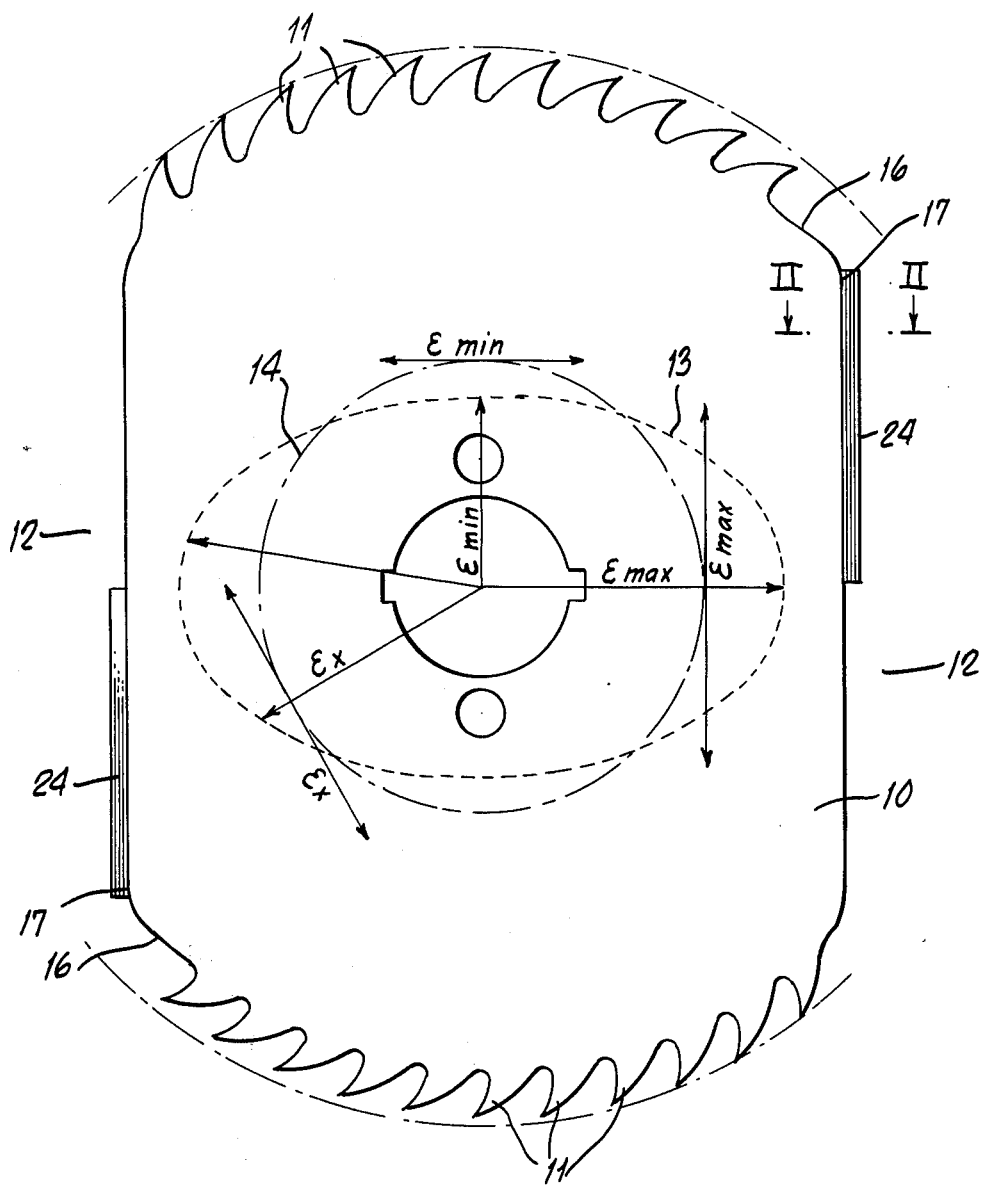
FIG. 1 shows in side view a spiral saw blade according to the invention.
Figure 2:
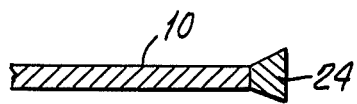
FIG. 2 shows a section of the spiral saw blade, along the line II — II of FIG. 1, when viewed in the direction of the arrows.

The spiral saw blade 10 shown in the drawing has teeth 11 that act in one direction. The teeth 11 are divided, by two gaps 12, into two tooth groups. The teeth 11 are in known-wise "set" or bulged or equipped with cutting plates. Through this the saw-cut is wider than the thickness of the spiral saw blade 10, so that a mixing or friction of the spiral saw blade in the saw-cut is avoided.

The accurately balanced saw blade in proper use is subjected to centrifugal forces that pass through the middle-point and have their maximums in a direction approximately toward the two groups of teeth 11. The resultant centrifugal forces in the region of the tooth groups are hereby at least 10% greater than the resultant centrifugal forces in the region of the gaps 12. This is because more material is present in the region of the tooth groups than in the region of the gaps 12.

The tangential stretching of material produced by the differing centrifugal forces when plotted radially of the middle-point results in an approximate oval. The oval 13 of the expansion diagram is shown in the drawing by a dotted line. The measurement circle 14 is shown in the drawing by a dot-dash line. At the measurement circle 14 are shown the expansions $\epsilon$min, $\epsilon$max, and an intermediate value $\epsilon$x. With the illustrated spiral saw blade 10, this blade 10 is shown as being uniform thickness. So that in the region of the gaps 12 smaller resultant centrifugal forces may occur, cut-outs are provided in the region of the tooth gaps 12. With the illustrated example of construction these cut-outs are provided at the outer edge of the spiral saw blade 10, in that the gaps 12, between the tooth groups 11, are of circular-segment shape. The gaps 12 between the tooth groups have a center-angle $\beta$ of at least 30°. Through this the sawing performance of the spiral saw blade 10 is substantially increased. The differing resultant centrifugal forces create no problems as respects centrifugal stresses and heat-expansions.

In each tooth group 11 the teeth 11, following the foremost tooth 11 in the direction of rotation, successively extend farther out of the sawblade 10 than does the tooth 11 ahead of it. Through this the teeth 11 are each subjected to approximately the same load as the first tooth 11. The sawing performance of the spiral saw blade 10 is thereby further improved. The difference between the heights of the highest and lowest tooth of each tooth group is according to the present invention at most 2% of the diameter.

As has already been said, the gaps 12 are made as cut-outs of circular-segment shape, and they extend inside the regions situated within the base-circle of the teeth. However the gaps 12 may also be made so that they enlarge funnel-shape toward the outside. For the first tooth 11 of each tooth group to be sufficiently ensured against lateral bending, the gaps 12 in each case are provided with salients 16 disposed ahead of the first tooth 11 in the direction of rotation. The salient 16 is arc-shaped and/or wedge-shaped, so that the front edge 17, in the direction of rotation is made to slope down and merges into the bottom of the cut-out 12. The angle between the front edge 17 of the salient 16 and a straight line running through the middle-point of the spiral saw blade 10 is greater than 0°. The front edge of 17 may hereby be provided with a cutting strip 24, whose width increases in the direction of rotation, and whose lengths extends approximately to the radially deepest point of the cut-out 12.

In order to obtain centering of the saw-cut relatively to the spiral saw blade 10, the front edge 17 of the salient 16, particularly in the case of saw blades 10 having teeth very slightly set, may be sharpened knife-fashion.

With the illustrated example of the construction of FIG. 1 only the upper tooth group 11 may be provided with the salient 16 having the front edge 17. However as illustrated in this Figure both tooth groups 11 may be provided ahead of their first tooth with such a salient 16 having a front edge 17.

Figure 3:
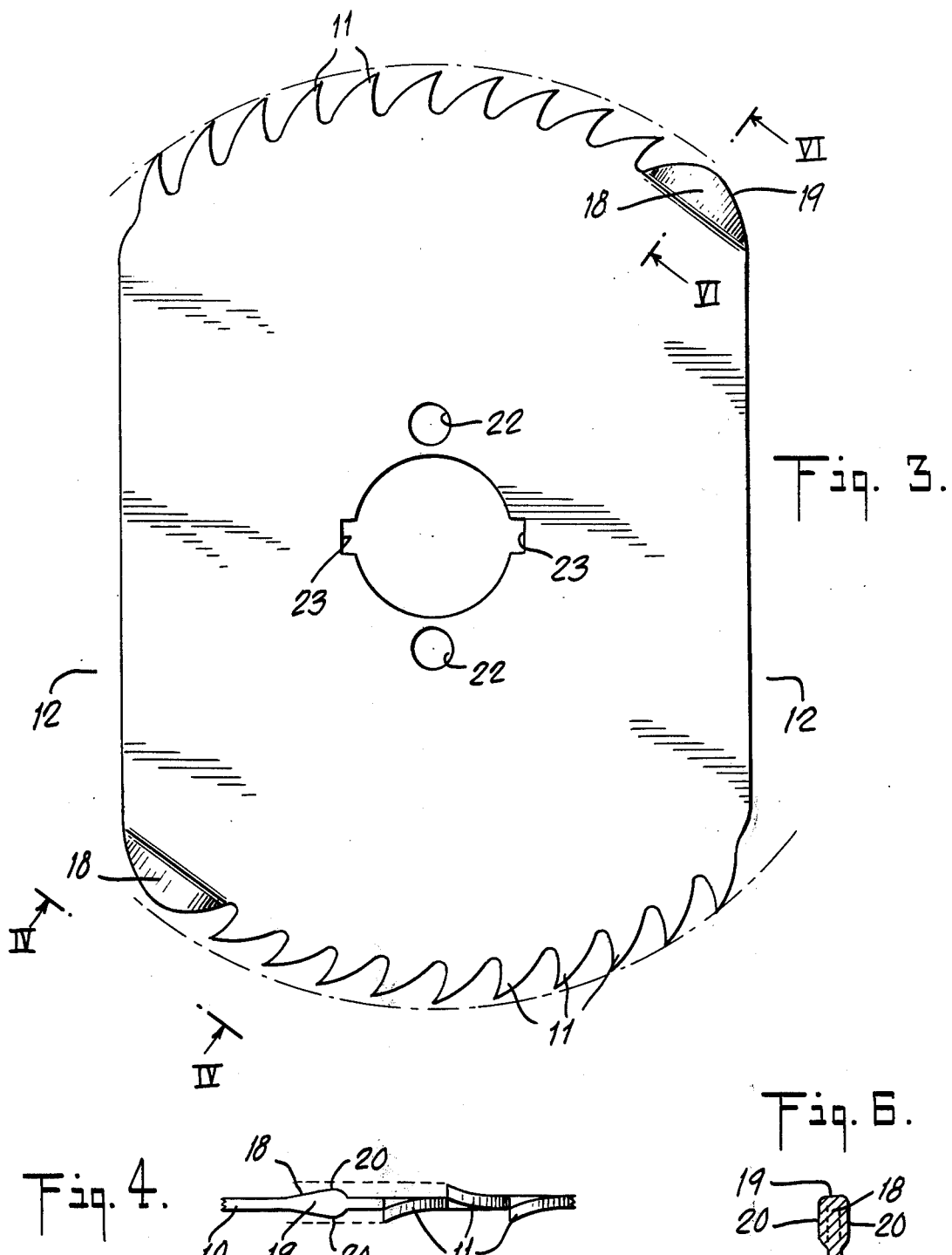
FIG. 3 shows a side view corresponding to that of FIG. 1 but of another form of construction.
Figure 4:
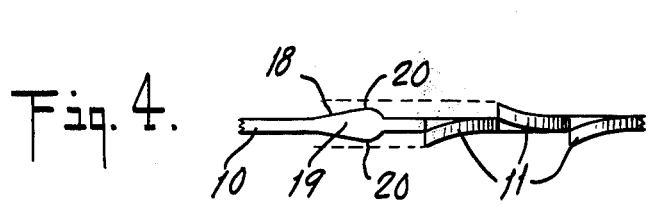
FIG. 4 shows a view along the line IV — IV of FIG. 3, and looking in the direction of the arrows.

In FIG. 3, as an alternative to salients 16 front edge 17, an advance-limiting protrusion 18 may be provided for each of the tooth groups 11. The advance-limiting protrusion 18 is made arc-shaped and/or wedge-shaped, so that the front flank 19 is made as an abutment slant. The advance-limiting protrusion is made sufficiently large that its tip projects to near the path of the teeth tips. Through this excessive loading of the front tooth 11 of each tooth-group is avoided. With proper use of the spiral saw blade 10 the work as a rule pressed against the spiral saw blade 10. At the instant in which the circular-segment gaps 12 become situated in front of the work-piece there is no opposition to the advance of the work-piece. The work-piece can thus get into the circular-segment gap 12. During further rotation of the spiral saw blade the advance-limiting projection 18, by its front flask 19 acting as an abutment slant, encounters the work-piece, so that this work-piece becomes pushed back, and the first tooth becomes subjected to only an allowable load.

Figure 5:
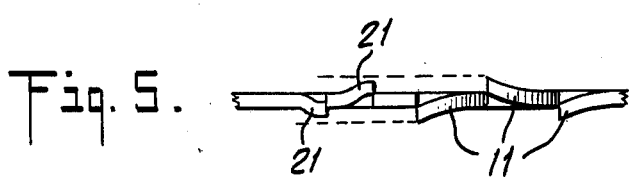
FIG. 5 shows a view similar to FIG. 4 but showing a modified version.
Figure 6:
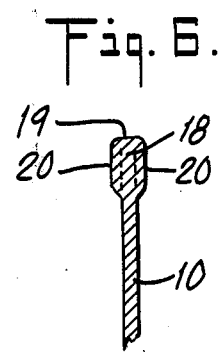
FIG. 6 shows a section along the line VI — VI of FIG. 3.

The advance-limiting projection 18 has at both side ribs 20 which taper down toward the front, whereby the total width of each advance-limiting projection comes almost to the width of the tooth-tips path. The total width of the advance-limiting projection 18 hereby preferably corresponds to 4/10 of the width of the tooth-tips path. By means of these side ribs 20 lateral deviation of the spiral saw blade 10 in the work-piece is avoided, because by means of the side ribs 20, which taper down toward the front, the saw-cut, and thus the work-piece, become centered relatively to the spiral saw blade 10. The advance-limiting projections 18, provided with ribs 20, can be made rounded. The ribs 20 can be made by being pressed out of the advance-limiting projections 18. In FIG. 5 is shown a second form of construction of the advance-limiting projections, whereby the side ribs 21 are made of wedge-shaped welded-on small metal plates.

As has already been explained, the gaps between the tooth groups 11 are preferably made of circular-sector shape. This results in a substantial saving of material. The gaps 12 are furthermore provided to avoid the problem of centrifugal stresses and heat-expansions in the spiral saw blade. The gaps 12 of circular-segment shape have a depth of at least 7% of the teeth-tips path diameter. This ensures that the tooth groups 11 have a sufficient number of teeth. The spiral saw blade 10 may have at least one passageway through it: nearby holes 22, spline grooves 23, or an opening for fitting on a contrivance for sharpening spiral saw blades.

As has already been mentioned, the explanations given concern only three forms of construction of the spiral saw blade given by way of example, the invention not being limited to this example. On the contrary many other designs and forms of construction are possible. Thus for example the gaps between the teeth groups can show a different shape instead of the circular-segment shape. In the arm of the gaps 12 holes or relieved sections can be provided too. Furthermore, the teeth of each group can be divided in a number of groups of teeth and each group can consist of two teeth only with spring set to opposite sides. The lowest teeth, which cut first in each group, can have alternating spring set, i.e., spring set to alternating sides.

What I claim is:

1. A spiral saw blade whose teeth are divided into two groups and in each group the foremost tooth is followed by teeth whose tips extend in succession farther out of the spiral saw blade than does the foremost tooth, characterized in that in the saw blade between the said two groups of teeth there is provided two oppositely disposed cut-outs each having a central angle of at least 30°, and further characterized in that the difference in height between the highest and lowest tooth of each group of teeth is of the magnitude or at most 2% of the diameter of the saw blade, whereby all of the teeth are subjected to substantially equal loading.

* * * * *

UNITED STATES PATENT AND TRADEMARK OFFICE
CERTIFICATE OF CORRECTION

PATENT NO. : 4,024,785
DATED : May 24, 1977
INVENTOR(S) : RÖTTGER JANSEN-HERFELD

It is certified that error appears in the above—identified patent and that said Letters Patent are hereby corrected as shown below:

<u>Claim 1</u>, line 10, change "or" to --- of ---

Signed and Sealed this

Twenty-seventh Day of September 1977

[SEAL]

Attest:

RUTH C. MASON
Attesting Officer

LUTRELLE F. PARKER
Acting Commissioner of Patents and Trademarks